(12) United States Patent
Gordon et al.

(10) Patent No.: US 8,661,773 B2
(45) Date of Patent: Mar. 4, 2014

(54) MEAT PACKAGING

(75) Inventors: Alec L. Gordon, Plainview, TX (US);
David R. McKenna, Benton, KS (US);
Derek J. Vote, Valley Center, KS (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 13/608,642

(22) Filed: Sep. 10, 2012

(65) Prior Publication Data
US 2013/0019574 A1 Jan. 24, 2013

Related U.S. Application Data

(62) Division of application No. 12/378,375, filed on Feb. 13, 2009, now abandoned.

(60) Provisional application No. 61/029,194, filed on Feb. 15, 2008, provisional application No. 61/066,000, filed on Feb. 15, 2008.

(51) Int. Cl.
*B65B 31/00* (2006.01)

(52) U.S. Cl.
USPC ............................................. 53/434; 53/443

(58) Field of Classification Search
USPC ....................... 53/434, 450, 64, 510, 512, 443
See application file for complete search history.

(56) References Cited

U.S. PATENT DOCUMENTS

| | | | |
|---|---|---|---|
| 3,224,554 A | 12/1965 | Moulder et al. | |
| 3,717,751 A | 2/1973 | Fluck | |
| 4,369,875 A | 1/1983 | Schmitz | |
| 4,421,222 A | 12/1983 | Stuermer | |
| 4,526,269 A | 7/1985 | Henderson | |
| 4,962,842 A | 10/1990 | Limoni | |
| 6,539,689 B1 | 4/2003 | Yoshimoto | |
| 6,843,169 B2 * | 1/2005 | Nielsen | 99/489 |
| 8,147,299 B2 * | 4/2012 | Mckenna et al. | 452/157 |
| 2009/0214724 A1 | 8/2009 | Gordon et al. | |

FOREIGN PATENT DOCUMENTS

| | | |
|---|---|---|
| WO | WO95/21375 | 8/1995 |
| WO | WO2007/138616 | 12/2007 |
| WO | WO2009/102479 | 8/2009 |

OTHER PUBLICATIONS

International Search Report mailed Jul. 12, 2009 to international Application No. PCT/US09/000933. 2 pages.

* cited by examiner

*Primary Examiner* — Sameh H. Tawfik

(57) ABSTRACT

Meat products are provided to an automated bagging system in a controlled and managed manner. Packaging systems in accordance with the present invention preferably include one or more buffering systems capable controlling the flow of meat products to a bagging system. Buffering systems are positioned along a meat product packaging line to provide such flow control. Plural buffering systems may be used as arranged in one or both of in series and in parallel.

15 Claims, 2 Drawing Sheets

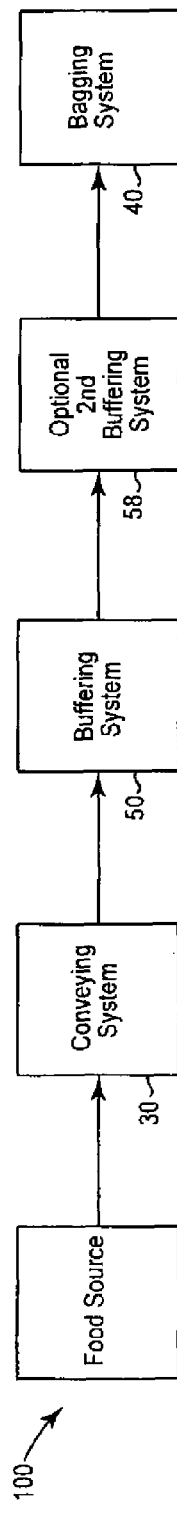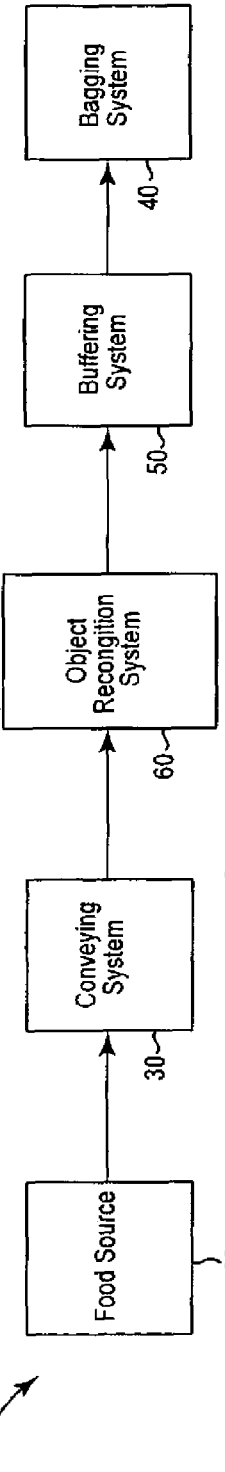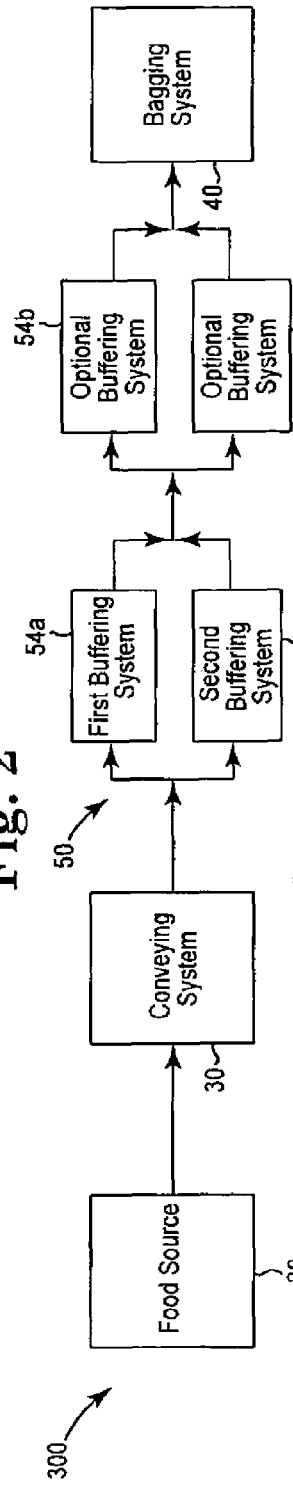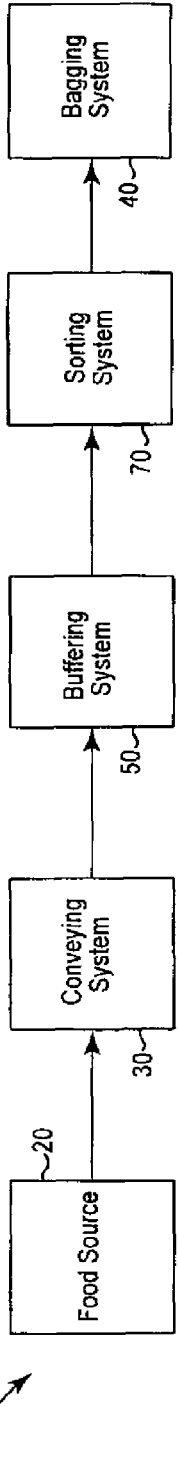

MEAT PACKAGING

CROSS REFERENCE TO RELATED APPLICATIONS

This application is a divisional of U.S. patent application Ser. No. 12/378,375, filed Feb. 13, 2009 now abandoned, which claims the benefit of U.S. Provisional application Ser. No. 61/029,194 filed Feb. 15, 2008, entitled FOOD PACKING SYSTEM and U.S. Provisional application Ser. No. 61/066,000, filed Feb. 15, 2008, entitled FOOD PACKING SYSTEM, which are hereby incorporated by reference in their entirety.

TECHNICAL FIELD

The present invention relates to food processing. More specifically, the present invention relates to methods and systems for automated packaging of meat products.

BACKGROUND

It is generally known to use automated bagging systems for meat products such as individual cuts of meat. In such known systems, the cuts of meat are individually placed or wrapped in a bag and air is subsequently evacuated from the bag. However, one shortcoming associated with such known bagging systems is that cuts of meat are sporadically conveyed to such bagging systems in an ebb and flow of product, resulting in one or more of a lack of timely product, blockages, and massive accumulation of product at the bagging systems.

It is also generally known to use machines that function to provide separation and single file placement of raw bulk poultry that is provided to a weighing scale (e.g. AEW Delford Systems checkweighers scale model No. G1000 commercially available from Marel Food Systems of Lexena, Kans.) or a check weigh scale (e.g. commercially available from Marel Food Systems of Lexena, Kans.). One such machine for use with bulk poultry is shown and described in U.S. Pat. No. 5,740,899 entitled "Positive Spacing Conveyor Apparatus" issued Apr. 21, 1998 to Roger Dale Pugh et al., which is incorporated herein by reference in its entirety for all purposes.

Accordingly, there is a need for systems for conveying food items to an automated bagging system or other downstream processing system. Further there is a need for systems for conveying food items to an automated bagging system that aids in the prevention of one or more of untimely product, blockages, and accumulation of product at the bagging or packaging systems.

SUMMARY

The present invention thus provides systems and methods that provide meat products to an meat processing system such as an automated packaging machine, for example, in a controlled and managed manner. Packaging systems in accordance with the present invention preferably include one or more buffering systems capable of controlling the flow of meat products to a bagging system. Buffering systems are strategically positioned along a meat product packaging line to provide such flow control. Plural buffering systems may be used as arranged in one or both of in series and in parallel. Buffering systems in accordance with the present invention can be used to provide a controlled flow of product to any desired processing system such as those that include one or more of bagging, weighing, sorting, cutting, and containing, for example.

In an aspect of the present invention a food processing system for packaging meat products is provided. The processing system comprising a source of meat products, a buffering station, and a packaging station arranged along a process flow path in that order, wherein the processing system is configured so the source of meat products provides a flow of randomly spaced meat products to a first conveyor system that transports the randomly spaced meat products to the buffering station and the buffering station converts the flow of randomly spaced meat products to a regular flow of meat products having a predetermined minimum spacing and provides the regular flow of meat products having a predetermined minimum spacing to a second conveyor system that transports the regular flow of meat products having a predetermined minimum spacing to the packaging station.

In another aspect of the present invention a food processing system for packaging meat products is provided wherein the buffering system comprises at least one of a uniform spacing device, a sensor coupled to a gate to regulate the distance between meat products on the second conveyor system, and a spiral conveyor coupled to a timing device to regulate the time spacing between meat products on the second conveyor system.

In another aspect of the present invention a food processing system for packaging meat products is provided wherein the buffering system comprises a first uniform spacing device coupled in-line to a second uniform spacing device, wherein the first uniform spacing device is configured to accumulate a first plurality of meat products having a first characteristic and the second uniform spacing device is configured to accumulate a second plurality of meat products having a second characteristic different from the first characteristic.

In another aspect of the present invention a food processing system for packaging meat products is provided wherein the food processing system comprises an object recognition system configured to identify a characteristic of the meat products, wherein the characteristic comprises at least one of type, dimension, and shape, and wherein the object recognition system is configured to direct a first plurality of meat products having a first characteristic to a first location and direct a second plurality of meat products having a second characteristic to a second location.

In another aspect of the present invention a method for packaging meat products is provided. The method comprises providing a flow of randomly spaced meat products as conveyed along a process flow path; at a first processing station positioned along the process flow path, identifying meat products having a common characteristic and directing the meat products having a common characteristic to a second processing station positioned downstream from the first processing station along the process flow path as a flow of randomly spaced meat products having a common characteristic; at the second processing station, converting the flow of randomly spaced meat products having a common characteristic to a regular flow of meat products having a predetermined minimum spacing and having a common characteristic; and at a third processing station positioned downstream from the second processing station along the process flow path, packaging the meat products.

In another aspect of the present invention a method for packaging meat products is provided. The method comprises providing a flow of randomly spaced meat products as conveyed along a process flow path; at a first processing station comprising a first uniform spacing device positioned along the process flow path, passing the flow of randomly spaced meat products through the uniform spacing device; at a second processing station comprising a second uniform spacing device positioned downstream from the first processing station along the process flow path, accumulating at least a portion of the flow of randomly spaced meat products at the second uniform spacing device; providing the accumulated meat products as a flow of meat products having a predetermined minimum spacing along the process flow path; and at a third processing station positioned downstream from the second processing station along the process flow path, packaging the meat products.

In another aspect of the present invention a method for packaging meat products comprises providing a flow of randomly spaced meat products from a fabrication table of a meat processing plant.

In another aspect of the present invention a method for packaging meat products comprises one or both of bagging the meat products and vacuum sealing the bagged meat products.

BRIEF DESCRIPTION OF THE DRAWINGS

The accompanying drawings, which are incorporated in and constitute a part of this disclosure, illustrate several aspects of the present invention and together with description of the exemplary embodiments serve to explain the principles of the present invention. A brief description of the drawings is as follows:

FIG. 1 is a schematic flow diagram of an exemplary food packaging system in accordance with the present invention and including a food source, conveying system, buffering system, optional second buffering system, and bagging system.

FIG. 2 is a schematic flow diagram of an exemplary packaging system in accordance with the present invention and including a food source, conveying system, object recognition system, buffering system, and bagging system.

FIG. 3 is a schematic flow diagram of an exemplary packaging system in accordance with the present invention and including a food source, conveying system, first and second buffering systems, optional buffering systems, and bagging system.

FIG. 4 is a schematic flow diagram of an exemplary packaging system in accordance with the present invention and including a food source, conveying system, buffering system, sorting system, and bagging system.

DETAILED DESCRIPTION

Figure 5:
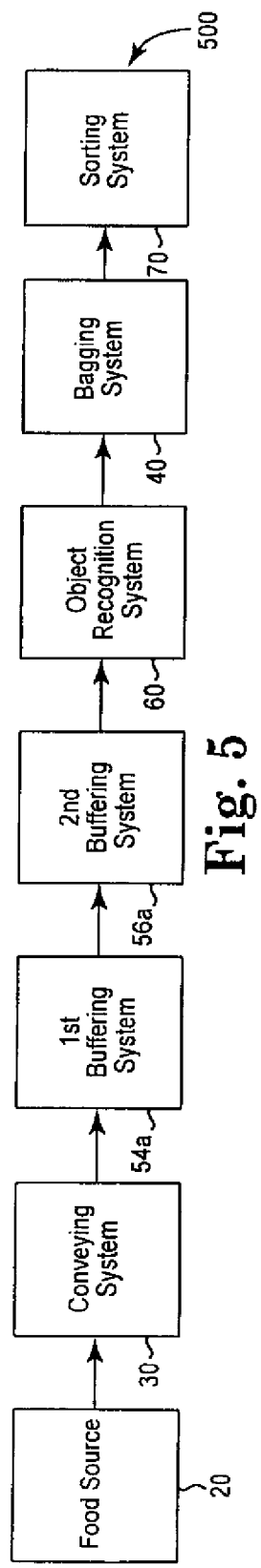
FIG. 5 is a schematic flow diagram of an exemplary packaging system in accordance with the present invention and including a food source, conveying system, first buffering system, second buffering system, object recognition system, bagging system, and sorting system.

The exemplary embodiments of the present invention described herein are not intended to be exhaustive or to limit the present invention to the precise forms disclosed in the following detailed description. Rather the exemplary embodiments described herein are chosen and described so those skilled in the art can appreciate and understand the principles and practices of the present invention.

Referring to FIG. 1-8, exemplary food (e.g. meat) packaging systems 100, 200, 300, 400, 500, 600, 700, and 800, respectively, are schematically illustrated. The illustrated food packaging systems disclose exemplary arrangements of processing stations in accordance with the present invention. Such processing stations include, for example, food source 20, conveying system 30, bagging system 40, buffering system 50, object recognition system 60, and sorting system 70. The identified processing stations are exemplary and additional processing stations such as are conventionally used in meat processing plants can be used. Moreover, such processing stations can be arranged in any desired order and the present invention is not limited to the exemplary packaging systems illustrated in FIGS. 1 through 8.

Referring to FIGS. 1-8, each food packaging system comprises food source 20. Food source 20 provides a source of food items to be further processed and ultimately packaged. Food source 20 is preferably derived from the processing of an animal and thus provides meat products. For example, in a preferred embodiment, the food source comprises meat products that result from processing of a bovine animal. The meat products may originate from any meat areas of an animal, such as from the sirloin, chuck, rib, loin, flank/plate, brisket/shank primals, subprimals thereof, and further cuts thereof including bone-in, boneless, commodity, close-trimmed, and combinations, for example. The meat products are typically generated from cutting primals and subprimals from the animals and placing or depositing such cuts onto conveyors otherwise known as boning, trimming, or fabrication tables in a meat fabrication plant. The meat products are often randomly deposited on the fabrication tables, depending in part on the speed of the conveyors associated with the fabrication tables and the speed of the workers disassembling the primal and subprimals. This random deposition can result in an ebb and flow of the quantity and spacing distance of the meat products deposited on the fabrication tables, which can also create unequal spacing in distance between meat products on the conveyors and may result in meat products touching one another or overlapping.

Referring to FIGS. 1-8, conveying system 30 transports meat products throughout the illustrated food packaging systems. Meat products are transported from food source 20 throughout the food packaging systems by conveying system 30. That is, conveying system 30 provides conveying functionality between each of the various systems of the exemplary illustrated food packaging systems. Conveying system 30 may comprise a variety of conveyors, such as belt conveyors, and such conveyors may be arranged in any desired manner including in series, parallel, inclined, and declined, for example.

Specific types of meat products can be associated with dedicated conveyors according to a preferred embodiment. For example, meat type A can be associated with a first dedicated conveyor for meat type A, whereas meat types B and C can be associated with second dedicated conveyor for meat types B and C. In an exemplary embodiment, meat type B can be associated with one side or area of the second conveyor, and meat type C can be associated with another side of the second conveyor such as when parallel conveyors are used.

Under certain processing conditions the various types of meat products may be commingled on the various conveyor systems. Accordingly, referring to FIGS. 2, 5, 6, and 8, the illustrated food packaging systems, as shown, preferably include an object recognition system 60. The object recognition system 60 can be positioned anywhere along the process flow and is not limited to the placement shown in the exemplary embodiments. The object recognition system 60 may additionally or alternatively comprise a weigh-scale system. The object recognition system 60 is preferably configured to identify a property of the meat products.

The property identified by the object recognition system 60 may include one or more of a feature, quality, characteristic, and attribute of the meat products. In an exemplary embodiment, the property identified by the object recognition system 60 includes a physical characteristic related to the shape, size, length, width, thickness, circumference, volume, density, and weight, for example, of the meat product. The property identified by the object recognition system 60 preferably relates to a property of the meat muscle of the meat product such as beef rib, rib eye, lip-on, and subprimal of a bovine carcass, for example. The property also preferably includes measurement of the area, length, width, depth, volume, and density, for example, of the meat muscle of the meat product. The property may also comprise the circumference of the cut of meat or any other 2-dimensional or 3-dimensional properties of the meat product according to alternative embodiments. The property may also comprise a property or quality of the lean portion of the meat product (e.g. meat, muscle, etc.) or a property or quality of the fat portion of the meat product. Systems and methods for measuring such properties are described in U.S. Patent publication No. 2007/0178819, to David R. McKenna et al. entitled "Meat Sortation" filed Jul. 27, 2006 and assigned to Cargill, Incorporated, the entire disclosure of which is incorporated by reference herein for all purposes.

Exemplary data inputs for the object recognition system 60 include data from laser scanning, image analysis, and x-ray scanning. Measurement of the property by the object recognition system 60 may be accomplished via objective criteria using equipment such as cameras or vision grading, for example, to determine surface area, color, linear measures such as one or more of length, width, and depth, x-ray to determine volume; ultrasound to measure volume or linear parameters such as one or more of length, width, and depth; laser to measure length, width, depth, volume, thermography to measure volume or linear measures such as one or more of length, width, and depth; magnetic resonance imaging (MRI) to measure volume or linear measures such as one or more of length, width, and depth; computerized tomography (CT) to determine volume or linear measures such as one or more of length, width, and depth; nuclear magnetic resonance (NMR) to measure volume or linear measures such as one or more of length, width, and depth, or hand-measurements or subject criteria such as estimates by human visualization and/or evaluation.

With such data, a model, such as a 3-dimensional model, of the meat products can be built. Sorting decisions based on the model can be made, such as by using logic, for example. Additionally, data obtained from the object recognition system can be used for any desired processing step such as processing steps that involves sorting. For example, data from the object recognition system can be used to assign a criteria to a meat product which criteria can be used in any subsequent processing operation such as for automatic sorting for directing packets the products to desired boxes or containers.

The object recognition system may be associated with a gate so that upon recognizing a certain property or characteristic such as a meat product having the shape of a particular cut of meat, the object recognition system can direct like pieces of meat product to a single location such as a conveyor, bin, or processing device dedicated to handling that particular type of meat product. The object recognition system may use known shapes and relationships associated with individual cuts of meat such as a known or predetermined 2-dimensional or 3-dimensional shape of a meat product, to predict the identity of the cut of meat, so that like cuts of meat can be directed to the appropriate location for batch holding or processing.

Conveying system 30 transports meat products from food source 20 to bagging system 40. Bagging system 40 preferably includes a bag loader and a vacuum packaging device. The bag loader may comprise any type of manual, semi-automatic or automatic device for enveloping the meat product in a container such as a flexible tapered plastic bag, for example. Typically, the bag loader urges one or more meat product between two sheets of material that form the walls of a bag. After the bag is placed around the meat product by the bag loader, conveying system 30 transports the meat product provided in the bag to the vacuum packaging device which removes the air from and seals the bag with the meat product inside.

Exemplary manual bag loaders include the Model 8164 manual bag loader with Model 8163 bag dispenser commercially available from Cryovac Sealed Air Corporation of Elmwood Park, N.J. Exemplary automatic bag loaders include the Models BL100 and BL101 tapered bag loaders (commonly referred to as a "horizontal" bag loader) commercially available from Cryovac Sealed Air Corporation of Elmwood Park, N.J. Additional exemplary automatic bag loaders include Flow-Vac model numbers 350, 450, and 550 such commercially available from Ulma Packaging of Ball Ground, Ga. Exemplary automatic bag loaders also include the Models BL145, BL125 and BL126 bag loaders (commonly referred to as "vertical" bag loaders) commercially available from Cryovac Sealed Air Corporation of Elmwood Park, N.J. Combinations of horizontal and vertical bag loaders may be used in the food packaging systems in accordance with the present invention. In accordance with the present invention any desired arrangement of bag loaders can be used including horizontal bag loaders, vertical bag loaders, and combinations thereof.

An exemplary vacuum packaging device includes a rotary vacuum chamber and sealing machine for fresh meats, such as the Model 8610-14 and 8610T-14E (or 86-008b-18) vacuum chamber machine commercially available from Cryovac Sealed Air Corporation of Elmwood Park, N.J. According to an alternative embodiment, the bagging system may include an integrated bag loader and vacuum packaging device such as the Model 8800E Automatic Bag Loader and Rotary Vacuum Chamber System commercially available from Cryovac Sealed Air Corporation of Elmwood Park, N.J.

In accordance with one aspect of the present invention, buffering systems preferably function to convert a continuous irregular flow of randomly spaced meat products to a continuous regular flow of uniformly spaced meat products for processing by the bagging system 40. In accordance with another exemplary aspect of the present invention, buffering systems preferably function to convert a flow of meat products having meat products that are touching, overlapping, or both to a flow of meat products having meat products that are individualized and distinct from each other. Buffering systems in accordance with the present invention provide the ability to controllably manage the flow of meat products in a meat packaging system during events such as downtime and changeover, for example. In an exemplary embodiment, after meat products have been accumulated by a buffering system, meat products can be provided to the next processing station as a flow of substantially equally spaced meat products. During production, where accumulation is not occurring, a buffering system preferably functions as a pass-through device that eliminates overlapping product and provides a flow of meat products having a predetermined minimum spacing. Advantageously, buffering systems in accordance with the present invention preferably function to assure that each individual piece of meat product is processed by a downstream processing station as a distinct individual piece. For example, object recognition systems and bagging systems preferably process meat products as distinct pieces.

Referring further to FIGS. 1 through 8, meat products from foods source 20 are preferably transported by conveying system 30 to the buffering systems (50, 54a, 56a, 54b, and 56b). Because the meat products are typically randomly deposited on the conveyors of conveying system 30, the meat products are typically randomly provided to the buffering systems. For example, the meat products may arrive at the buffering system at unequally spaced time intervals or at unequal distances between individual meat products or vice versa. Also, multiple pieces of a meat product may arrive simultaneously. Accordingly, a continuous irregular flow of randomly spaced meat products is typically provided by conveying system 30 the buffering systems.

Buffering systems preferably includes a rotary single file placement device. Such devices are also referred to as positive spacing conveyor apparatuses, singulators, or singlefilers. The meat products provided to the buffering system are preferably processed as batches by the buffering systems. Buffering systems are preferably configured to take inputs of surges of meat products and output a controlled flow of the meat products, such as time or distance, thereby inhibiting unnecessary production stoppages. For example, the buffering system can be configured to parse out individual meat products one at a time, in single file order, so that each meat product is generally equally spaced in distance from another depending on the constant speed of a conveyor. The buffering system can accomplish this spacing of meat products by parsing the meat products onto conveying system 30 at set intervals of time. Accordingly buffering systems converts a continuous irregular flow of randomly spaced meat products to a continuous regular flow of uniformly spaced meat products that can be provided to the bagging system 40.

Buffering systems can be fully or partially loaded with meat products of the same meat type such as by loading only chucks or only lipons (or strip loins), for example, having the same characteristics such as select grade, choice grade, weight, and volume, for example. After loading, the buffering system can output the meat products with a consistent separation and having predetermined spacing in time and distance between the meat products.

Certain conveyors and associated buffering systems may be dedicated to certain types of meat products such as chucks, lipons (or strip loins), briskets, briskets, top butts, strips, tenderloins, knuckles, bottom round flats, eye of rounds, and inside rounds, for example. In an exemplary embodiment, a conveyor system having parallel conveyors can be used. A first type of meat product is processed on one side of the conveyor and a second type of meat product different from the first type of meat product is processed on the opposite side of the conveyor. Thus, the conveyor may be dedicated to a certain type of meat product such as wherein only lipons (or strip loins) or briskets are conveyed on a particular conveyor.

The meat products on the dedicated conveyors are transported to the buffering system, which is also preferably dedicated to a particular type of meat product. For example, in an exemplary embodiment, only lipons (or strip loins) meat pieces are processed on the dedicated conveyor (or dedicated side of the conveyor) and are transported to the dedicated lipons (or strip loins) meat product buffering system and only brisket meat pieces are processed on the dedicated conveyor (or dedicated side of the conveyor) and are transported to the dedicated lipons (or strip loins) meat buffering system. According to an alternative embodiment, dedicated conveyors and dedicated buffering systems can be switched over to other types of meat products, for example during a shift at a plant or during changeover to a different type of meat product from the food source.

Preferably, in accordance with the present invention, plural buffering systems are arranged in series as illustrated in FIGS. 1, 2, 5, and 6. Using plural buffering systems in series allows each buffering system to be controlled cooperatively. Referring to FIG. 1 in particular, buffering systems 50 and 58 are shown as configured in series. During a downstream shutdown event, for example, meat products are accumulated by buffering system 58 while buffering system 50 functions as a pass-through conveyor. This arrangement advantageously increases the amount of time that meat products can be accumulated in the packaging system. For example, in the case where a single buffering system can provide about 3 minutes of accumulation time, adding a second buffering system increases the effect of accumulation time to about 6 minutes.

Figure 8:
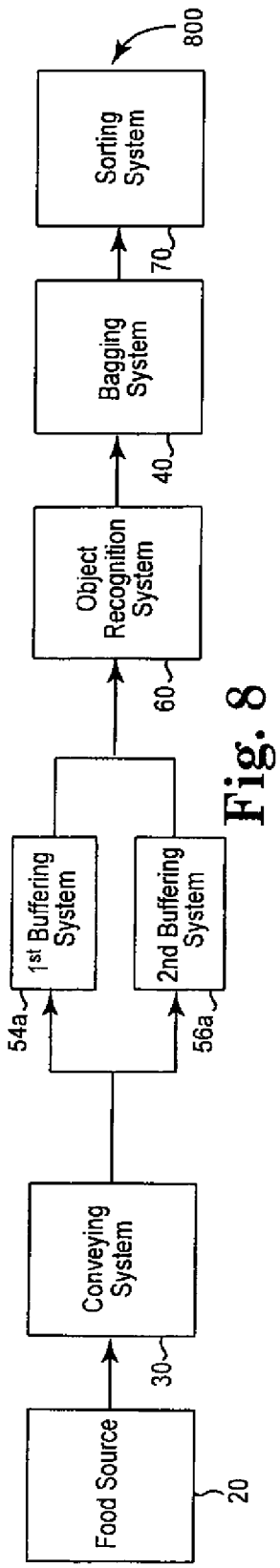
FIG. 8 is a schematic flow diagram of an exemplary packaging system in accordance with the present invention including a food source, conveying system, first and second buffering systems, object recognition system, bagging system, and sorting system.

Plural buffering systems may also be arranged in parallel. Referring to FIGS. 3 and 8 first and second buffering systems 54a and 56a, respectively, are shown as arranged in parallel. One exemplary service procedure for the bagging system 40 takes about 2 minutes to accomplish. In order to complete the service procedure, the bagging system 40 is stopped. During the downtime a gate on the second buffering system 56a is closed which prevents meat products from entering the bagging system 40. Once the second buffering system 56a reaches capacity a gate on the first buffering system 54a closes which allows additional accumulation of meat products. In an exemplary embodiment, each buffering system can hold about 3 minutes worth of production. When the service procedure on the bagging system 40 is completed the first and second buffering systems 54a and 56a, respectively, work in concert to meter out the accumulated meat products in an organized fashion. Preferably, the packaging system 300 is configured to run at 70% of capacity during normal production and ramps up to 100% capacity after accumulation of meat products, such as described above, so the accumulated inventory of meat products can be cleared from the processing system 300.

According to a preferred embodiment, the buffering system comprises a rotary single file placement device commercially available from L&W Equipment, Inc. of Poteau, Okla. The buffering system may also comprise a dynamic accumulation spiral conveyor which multiple spiral conveyors may be arranged in series or parallel. Sprial conveyors are designed for continuous vertical product flow. The buffering system may comprise a Ryson Vertical Accumulation Buffer spiral conveyor commercially available from Ryson International, Inc. of Yorktown, Va. The buffering system may also comprise an AmbaFlex SpiralVeyor® SV spiral conveyor commercially available from AmbaFlex, Inc. of Bedford, Tex.

The buffering system may also comprise any bin or hopper that releases meat products at a predetermined time to ensure a minimum time or spacing distance of meat products on a conveyor. The buffering system may also comprise a vision system such as a photo eye or the like that controls a gate or door to ensure adequate spacing between meat products on a conveyor. The buffering system may also include a worker that manually ensures minimum distances between meat products on a conveyor transporting the meat products to the bagging system.

Typically, a meat plant processes carcasses having a certain meat characteristic or grade such as USDA Prime grade, USDA Choice grade, and USDA Select grade, for example, as a batch or at the same time. Thus, the food source produces meat products or types of meat having a like characteristic for a period of time. After a certain period of time of running one batch of carcasses having like grades of meat, the plant will conduct a "changeover" to carcasses having a different grade of meat such as running USDA Choice carcasses as a batch and subsequently changing to run USDA Select carcasses as a batch. Changeover comprises an event that occurs downstream from the buffering system and the bagging system. According to a particularly preferred embodiment, meat cuts from the two grades are completely segregated in adherence with truth in labeling requirements.

The use of multiple buffering systems can help to reduce changeover time between grades of meat and helps to provide complete segregation. Multiple buffering systems shown as a first buffering system 54a and a second buffering system 56a in shown in FIGS. 3 and 8 may be used to facilitate line or plant changeovers and accommodate different types or grade of meat products. Referring to FIGS. 3 and 8 in an exemplary embodiment prior to changeover first buffering system 54a is loaded with meat products of the same type and having the same characteristic. For example, prior to changeover first buffering system 54a can be loaded with USDA choice grade inside rounds. Before and at the point of changeover, first buffering system 54a will continue to be loaded with USDA Choice grade inside rounds until the source of USDA Choice grade inside rounds is depleted, and first buffering system 54a will continue to parse out USDA Choice grade inside rounds to bagging system 40. As changeover material (USDA Select grade inside rounds) works its way downstream to buffering system 50, second buffering system 56a is loaded with only USDA select grade inside rounds. As a result, the first buffering system may be loaded and unloaded with a first material during changeover, and then bypassed for loading (and eventual unloading) of the second buffering system with a second material. Accordingly, the gap in time for loading and unloading different materials during a changeover may be decreased.

Figure 6:
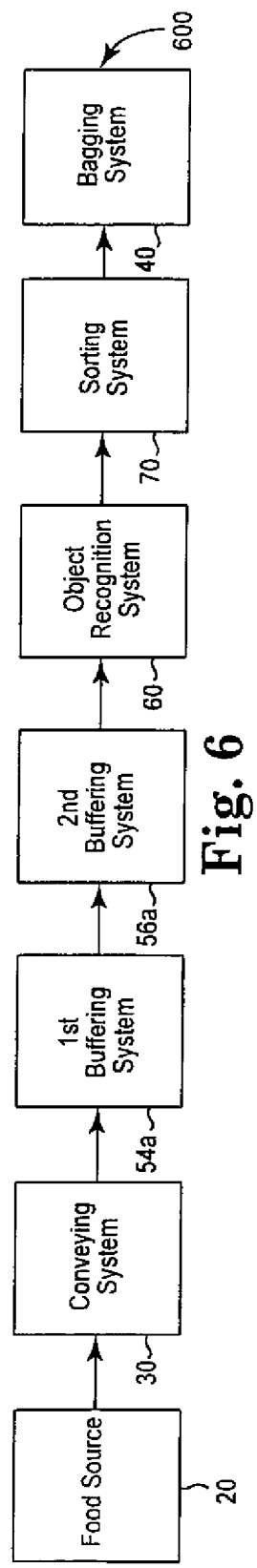
FIG. 6 is a schematic flow diagram of an exemplary packaging system in accordance with the present invention including a food source, conveying system, first buffering system, second buffering system, object recognition system, sorting system, and bagging system.
Figure 7:
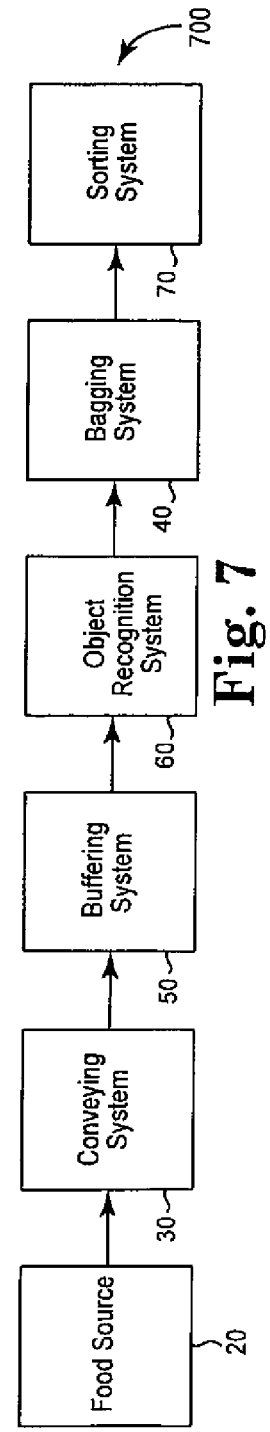
FIG. 7 is a schematic flow diagram of an exemplary packaging system in accordance with the present invention including a food source, conveying system, buffering system, object recognition system, bagging system, and sorting system.

Referring to FIGS. 5 and 6 first buffering system 54a and second buffering system 56a are preferably configured in-line or in series with one another. Meat cuts that are USDA Choice are preferably fed into first buffering system 54a which parses the meat cuts into in-line second buffering system 56a, which parses the meat cuts to bagging device 40. During changeover, once the last USDA Choice meat cut has transferred into second buffering system 56a, a close gate is actuated on the outfeed portion of first buffering system 54a. This makes it so that USDA Select meat cuts can transfer from the fabrication table into first buffering system 54a, however the USDA Select meat cuts are restricted from entering second buffering system 56a. After the USDA Choice cuts have cleared the second buffering system 56a, the close gate of the second buffering system 56a is activated and the close gate of the first buffering system 54a is deactivated allowing the USDA Select cuts to transfer from the first buffering system 54a to the second buffering system 56a while continuing to maintain segregation between the USDA Choice and USDA Select cuts. Once the USDA Choice cuts are cleared from bagging device 40, the close gate on second buffering system 56a is retracted, thus allowing USDA Select product to flow into bagging device 40. This process creates distinct separation of the two grades of product, with minimal interference of production time. According to alternative embodiments, there may be greater than two buffering systems used and such devices may be arranged in series, for example. According to alternative embodiments, the multiple buffering systems may be arranged or configured in parallel with respect to the meat fabrication line. According to alternative embodiments, release of meat products from the second buffering system 56a may occur after preceding meat products have cleared the bagging device 40, or after meat products have been placed into a labeled box.

Referring now to FIG. 3, two banks of buffering systems are shown: (i) first and second buffering systems 54a and 56a preferably dedicated to a first meat type in an exemplary process; and (ii) first and second buffering systems 54b and 56b preferably dedicated to a second meat type in the exemplary process. An exemplary process for providing first and second meat types to the buffering systems before and after changeover includes several steps. Before changeover, meat products having the first meat type and a known grade (e.g. USDA Choice) are transported on one side of conveying system 30 to first buffering system 54a. After changeover, the meat products having the first meat type of a different grade (e.g. USDA Select grade) are transported to second buffering system 56a so the first buffering system 54a is bypassed for loading. Next, the meat products of the first meat type and of USDA Choice grade are ejected from first buffering system 54a and the meat products of the first meat type of USDA Select grade are ejected from second buffering system 56a to be processed by bagging system 40.

Regarding the meat products of the second meat type, before changeover the meat products of the second meat type having a known grade (e.g. USDA Choice grade) are transported on one side of conveying system 30 to first buffering system 54b. After changeover, the meat products of the second meat type having a different grade (e.g. USDA Select grade) are transported to second buffering system 56b so the first buffering system 54b is bypassed for loading. Next, the meat products of the first meat type and having USDA Choice grade are ejected from first buffering system 54b and the meat products of the second type and having the USDA Select grade are ejected from second buffering system 56b to be processed by the bagging system 40.

Referring to FIGS. 4 through 8, illustrated food packaging systems preferably include a sorting system 70. Sorting system 70 is useful for identifying whether a meat product or cut of meat (e.g. ejected from the buffering system) for example, has a particular property, attribute, characteristic, or parameter. Cuts of meat having like attributes may be directed to a like location for storage, shipment, and processing individually or as a batch. The sorting system can be located anywhere on the meat processing line such as near the food source, before items of food are provided to a buffering system, after the buffering system, and associated with the bag loader or vacuum packaging device, for example. According to an alternative embodiment, the bagging system prints a label or identification marks or indicia on the bag for the meat products that is representative of the attribute of the meat, which can facilitate grouping and sorting during packaging, transportation and shipment.

Although many of the embodiments described in this disclosure relate to food sources comprising beef such as steers and heifers, the food packaging systems may be applied to carcasses, subprimals or any smaller cuts of meat from any animal protein including all bovine (*Bos Taurus* & *Bos Indicus*), porcine, equine, caprine, and ovine animals, or any other animal harvested for food production including poultry, fish, and veal. In this specification, bovine animals include, but are not limited to, buffalo and all cattle, including steers, heifers, cows and bulls. Porcine animals include, but are not limited to, feeder pigs and breeder pigs, including sows, gilts, barrows and boars. Ovine animals include, but are not limited to, sheep, including ewes, rams, wethers and lambs.

Although embodiments of a particular improved system and method are disclosed, it should be observed that the invention includes, but is not limited to a novel structural or functional combination of elements and features, and not in the particular detailed configurations disclosed herein. Accordingly, the structure, methods, functions, control, and arrangement of components have, for the most part, been illustrated in the drawings by readily understandable block representations and schematic diagrams, in order not to obscure the disclosure with structural details which will be readily apparent to those skilled in the art, having the benefit of the description herein.

The present invention has now been described with reference to several exemplary embodiments thereof. The entire disclosure of any patent or patent application identified herein is hereby incorporated by reference for all purposes. The foregoing disclosure has been provided for clarity of understanding by those skilled in the art of meat processing. No unnecessary limitations should be taken from the foregoing disclosure. It will be apparent to those skilled in the art that changes can be made in the exemplary embodiments described herein without departing from the scope of the present invention. Thus, the scope of the present invention should not be limited to the exemplary structures and methods described herein, but only by the structures and methods described by the language of the claims and the equivalents of those claimed structures and methods.

What is claimed is:

1. A method for packaging meat products, the method comprising:
    providing a flow of randomly spaced meat products as conveyed along a process flow path;
    at a first processing station positioned along the process flow path, measuring a characteristic of each the meat products by an object recognition system using measurement equipment, generating data from the object recognition system regarding the meat products, assigning a criteria to the meat products based on the data and automatically sorting the meat products using the criteria assigned to the meat product to direct meat products having a common characteristic to a second processing station positioned downstream from the first processing station along the process flow path as a flow of randomly spaced meat products having a common characteristic;
    at the second processing station, converting the flow of randomly spaced meat products having a common characteristic to a regular flow of meat products having a predetermined minimum spacing and having a common characteristic;
    and at a third processing station positioned downstream from the second processing station along the process flow path, packaging the meat products.

2. The method for packaging meat products of claim 1, wherein converting the flow of randomly spaced meat products having a common characteristic to a regular flow of meat products having a predetermined minimum spacing and having a common characteristic comprises batch processing plural groups of meat products.

3. The method for packaging the products of claim 1, comprising providing the flow of randomly spaced meat products from a fabrication table of a meat processing plant.

4. The method for packaging meat products of claim 1, wherein packaging the meat products comprises one or both of bagging the meat products and vacuum sealing the bagged meat products.

5. The method for packaging meat products of claim 1, wherein the measurement equipment comprises a camera or vision grading equipment.

6. The method for packaging meat products of claim 1, wherein the measurement equipment comprises equipment selected from an x-ray, ultrasound, laser, thermography, magnetic resonance imaging (MRI), computerized tomography (CT), nuclear magnetic resonance (NMR), and combinations thereof.

7. The method for packaging meat products of claim 1, wherein the object recognition system includes data inputs from laser scanning, image analysis, or x-ray scanning.

8. The method for packaging meat products of claim 1, wherein the second processing station comprises plural buffering systems arranged in series.

9. The method for packaging meat products of claim 1, wherein the second processing station comprises plural buffering systems arranged in parallel.

10. A method for packaging meat products, the method comprising:
    providing a flow of randomly spaced meat products as conveyed along a process flow path;
    at a first set of processing stations positioned along the process flow path, measuring a characteristic of each the meat products by an object recognition system using measurement equipment, generating data from the object recognition system regarding the meat products and assigning a criteria to the meat products based on the data;
    directing the meat products to a second set of processing stations positioned downstream from the first set of processing station along the process flow path as a flow of randomly spaced meat products;
    at the second set of processing stations, converting the flow of randomly spaced meat products to a regular flow of meat products having a predetermined minimum spacing; and,
    at a third processing station positioned downstream from the second set of processing stations along the process flow path, automatically sorting the meat products using the criteria assigned to the meat product and directing the meat products to desired boxes or containers.

11. The method for packaging meat products of claim 10, wherein the measurement equipment comprises a camera or vision grading equipment.

12. The method for packaging meat products of claim 10, wherein the measurement equipment comprises equipment selected from an x-ray, ultrasound, laser, thermography, magnetic resonance imaging (MRI), computerized tomography (CT), nuclear magnetic resonance (NMR), and combinations thereof.

13. The method for packaging meat products of claim 10, wherein the object recognition system includes data inputs from laser scanning, image analysis, or x-ray scanning.

14. The method for packaging meat products of claim 10, wherein the second processing station comprises plural buffering systems arranged in series.

15. The method for packaging meat products of claim 10, wherein the second processing station comprises plural buffering systems arranged in parallel.

* * * * *